US009693285B2

United States Patent
Yanagi et al.

(10) Patent No.: US 9,693,285 B2
(45) Date of Patent: Jun. 27, 2017

(54) COMMUNICATION APPARATUS

(71) Applicant: FUJITSU COMPONENT LIMITED, Tokyo (JP)

(72) Inventors: Masahiro Yanagi, Tokyo (JP); Kimihiro Maruyama, Tokyo (JP); Tatsuya Kakehashi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 84 days.

(21) Appl. No.: 14/625,821

(22) Filed: Feb. 19, 2015

(65) Prior Publication Data

US 2015/0249949 A1    Sep. 3, 2015

(30) Foreign Application Priority Data

Feb. 28, 2014 (JP) ................................. 2014-039619

(51) Int. Cl.
  *H04W 40/12* (2009.01)
  *H04L 12/733* (2013.01)
  (Continued)

(52) U.S. Cl.
  CPC .............. *H04W 40/12* (2013.01); *H04B 7/14* (2013.01); *H04L 45/122* (2013.01);
  (Continued)

(58) Field of Classification Search
  CPC .................................................... H04W 40/12
  See application file for complete search history.

(56) References Cited

U.S. PATENT DOCUMENTS 7,983,670 B1 *   7/2011   Elliott ................ H04M 3/2245
                                                             370/216
2004/0242174 A1 * 12/2004  Kim ..................... H03G 3/3052
                                                             455/136
(Continued)

FOREIGN PATENT DOCUMENTS

JP          2001-237764          8/2001

OTHER PUBLICATIONS

Valentini G et al: "Dynamic multi-objective routing algorithm: a multi-objective routing algorithm for the simple hybrid routing protocol on wireless sensor networks", IET Communications,, vol. 4, No. 14, Sep. 24, 2010 (Sep. 24, 2010), pp. 1732-1741, XP006036708, ISSN: 1751-8636, DOI: 10.1049/IET-COM:20090805.

*Primary Examiner* — Jason Mattis
(74) *Attorney, Agent, or Firm* — IPUSA, PLLC

(57) ABSTRACT

A communication apparatus includes a detection unit that detects a first apparatus that is able to wirelessly communicate with the communication apparatus; a first selection unit that determines a route for communication between the communication apparatus and a communication destination, the route may include an intervening apparatus that relays communication between the communication apparatus and the communication destination, and selects, if plural routes are determined, a first route where a number of the intervening apparatuses is smallest from among the determined routes; and a second selection unit that, when two or more first routes are selected by the first selection unit, calculates, for each of the first routes, a sum of squares of each of first signal strength between two apparatuses in the determined first route as a second signal strength, and selects the route having the highest second signal strength from the determined first routes.

8 Claims, 14 Drawing Sheets

(51) Int. Cl.
*H04L 12/721* (2013.01)
*H04B 7/14* (2006.01)
*H04W 24/02* (2009.01)
*H04W 48/16* (2009.01)

(52) U.S. Cl.
CPC ............ *H04L 45/124* (2013.01); *H04L 45/20* (2013.01); *H04W 24/02* (2013.01); *H04W 48/16* (2013.01)

(56) References Cited

U.S. PATENT DOCUMENTS

| | | | |
|---|---|---|---|
| 2006/0280131 A1* | 12/2006 | Rahman | H04L 45/02 370/256 |
| 2011/0267982 A1* | 11/2011 | Zhang | H04B 7/2606 370/256 |
| 2012/0014362 A1 | 1/2012 | Inada | |
| 2013/0279409 A1 | 10/2013 | Dublin, III et al. | |

* cited by examiner

FIG.2

|  | (1) | (2) | (3) | (4) |
|---|---|---|---|---|
| RELAY-STATION COUNT | 1 | 2 | 1 | 2 |
| RSSI OF SECTION 1 | −80 | −40 | −30 | −20 |
| RSSI OF SECTION 2 | −40 | −40 | −90 | −70 |
| RSSI OF SECTION 3 | − | −40 | − | −70 |
| TOTAL RSSI | −120 | −120 | −120 | −160 |
| RSSI SQUARE SUM | 8000 | − | 9000 | − |

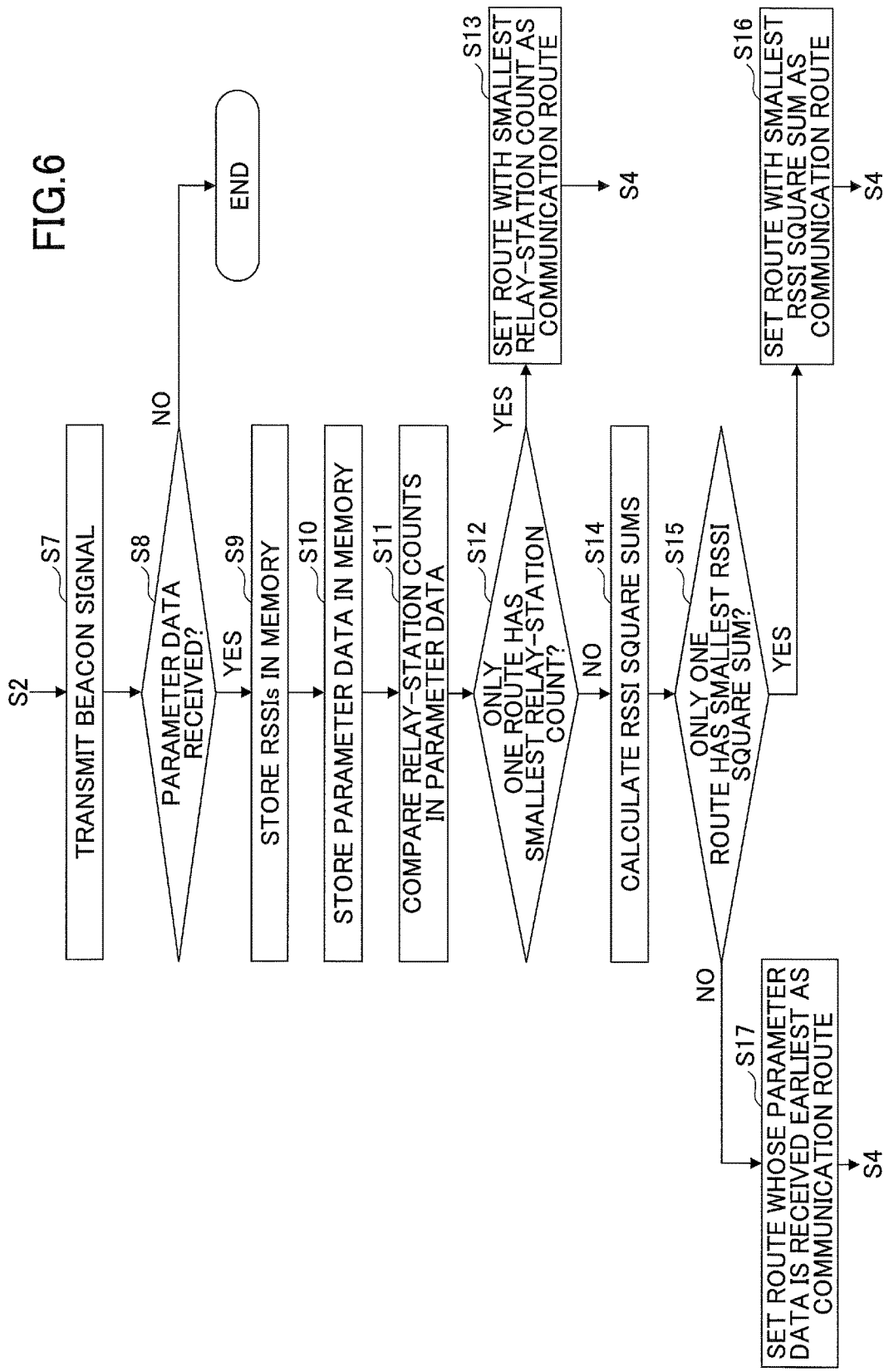

FIG.7A

|  | D1 | D2 | D4 | D5 |
|---|---|---|---|---|
| RELAY-STATION COUNT | 0 | 1 | 0 | 1 |
| RSSI OF FIRST FORWARD SECTION | −40 | −40 | −90 | −70 |
| RSSI OF SECOND FORWARD SECTION | N/A | −40 | N/A | −70 |
| RSSI | −80 | −40 | −30 | −20 |

FIG.7B

|  | D1 | D4 |
|---|---|---|
| RELAY-STATION COUNT | 0 | 0 |
| RSSI OF FIRST FORWARD SECTION | −40 | −90 |
| RSSI | −80 | −30 |

FIG.8

|  | RELAY STATION 1 | RELAY STATION 2 | RELAY STATION 3 | RELAY STATION 4 |
|---|---|---|---|---|
| D1 | N/A | N/A | N/A | N/A |
| D2 |  |  |  |  |
| D3 |  |  |  |  |
| D4 |  |  |  |  |
| D5 |  |  |  |  |
| D6 |  |  |  |  |

FIG.9

|  | D1 | D2 | D3 | D4 | D5 | D6 |
|---|---|---|---|---|---|---|
| RELAY-STATION COUNT | 0 |  |  |  |  |  |
| RSSI OF SECTION 1 | −40 |  |  |  |  |  |
| RSSI OF SECTION 2 | N/A |  |  |  |  |  |

FIG.10

|  | RELAY STATION 1 | RELAY STATION 2 | RELAY STATION 3 | RELAY STATION 4 |
|---|---|---|---|---|
| D1 | N/A | N/A | N/A | N/A |
| D2 | D1 | N/A | N/A | N/A |
| D3 |  |  |  |  |
| D4 |  |  |  |  |
| D5 |  |  |  |  |
| D6 |  |  |  |  |

FIG.11

|  | D1 | D2 | D3 | D4 | D5 | D6 |
|---|---|---|---|---|---|---|
| RELAY-STATION COUNT | 0 | 1 |  |  |  |  |
| RSSI OF SECTION 1 | −40 | −40 |  |  |  |  |
| RSSI OF SECTION 2 | N/A | −40 |  |  |  |  |

FIG.12

|    | RELAY STATION 1 | RELAY STATION 2 | RELAY STATION 3 | RELAY STATION 4 |
|----|-----------------|-----------------|-----------------|-----------------|
| D1 | N/A             | N/A             | N/A             | N/A             |
| D2 | D1              | N/A             | N/A             | N/A             |
| D3 |                 |                 |                 |                 |
| D4 | N/A             | N/A             | N/A             | N/A             |
| D5 |                 |                 |                 |                 |
| D6 | N/A             | N/A             | N/A             | N/A             |

FIG.13

|                      | D1  | D2  | D3 | D4  | D5 | D6  |
|----------------------|-----|-----|----|-----|----|-----|
| RELAY-STATION COUNT  | 0   | 1   |    | 0   |    | 0   |
| RSSI OF SECTION 1    | −40 | −40 |    | −90 |    | −70 |
| RSSI OF SECTION 2    | N/A | −40 |    | N/A |    | N/A |

FIG.14

|  | RELAY STATION 1 | RELAY STATION 2 | RELAY STATION 3 | RELAY STATION 4 |
|---|---|---|---|---|
| D1 | N/A | N/A | N/A | N/A |
| D2 | D1 | N/A | N/A | N/A |
| D3 |  |  |  |  |
| D4 | N/A | N/A | N/A | N/A |
| D5 | D6 | N/A | N/A | N/A |
| D6 | N/A | N/A | N/A | N/A |

FIG.15

|  | D1 | D2 | D3 | D4 | D5 | D6 |
|---|---|---|---|---|---|---|
| RELAY-STATION COUNT | 0 | 1 |  | 0 | 1 | 0 |
| RSSI OF SECTION 1 | −40 | −40 |  | −90 | −70 | −70 |
| RSSI OF SECTION 2 | N/A | −40 |  | N/A | −70 | N/A |

FIG.16

|  | RELAY STATION 1 | RELAY STATION 2 | RELAY STATION 3 | RELAY STATION 4 |
|---|---|---|---|---|
| D1 | N/A | N/A | N/A | N/A |
| D2 | D1 | N/A | N/A | N/A |
| D3 | D1 | N/A | N/A | N/A |
| D4 | N/A | N/A | N/A | N/A |
| D5 | D6 | N/A | N/A | N/A |
| D6 | N/A | N/A | N/A | N/A |

FIG.17

|  | D1 | D2 | D3 | D4 | D5 | D6 |
|---|---|---|---|---|---|---|
| RELAY-STATION COUNT | 0 | 1 | 1 | 0 | 1 | 0 |
| RSSI OF SECTION 1 | −40 | −40 | −80 | −90 | −70 | −70 |
| RSSI OF SECTION 2 | N/A | −40 | −40 | N/A | −70 | N/A |

FIG.20

A
| PAN ID | DESTINATION ID | OWN ID | RELAY-STATION COUNT | RELAY-1 ID | RELAY-2 ID | RELAY-3 ID | FINAL DESTINATION ID | ORIGINATOR ID | DATA |
|---|---|---|---|---|---|---|---|---|---|
| 11 | D12 | D13 | 0 | DUMMY | DUMMY | DUMMY | C11 | D13 | - |

B
| PAN ID | DESTINATION ID | OWN ID | RELAY-STATION COUNT | RELAY-1 ID | RELAY-2 ID | RELAY-3 ID | FINAL DESTINATION ID | ORIGINATOR ID | DATA |
|---|---|---|---|---|---|---|---|---|---|
| 11 | D11 | D12 | 1 | D12 | DUMMY | DUMMY | C11 | D13 | - |

C
| PAN ID | DESTINATION ID | OWN ID | RELAY-STATION COUNT | RELAY-1 ID | RELAY-2 ID | RELAY-3 ID | FINAL DESTINATION ID | ORIGINATOR ID | DATA |
|---|---|---|---|---|---|---|---|---|---|
| 11 | C11 | D11 | 2 | D12 | D11 | DUMMY | C11 | D13 | - |

D
| PAN ID | DESTINATION ID | OWN ID | RELAY-STATION COUNT | RELAY-1 ID | RELAY-2 ID | RELAY-3 ID | FINAL DESTINATION ID | ORIGINATOR ID | DATA |
|---|---|---|---|---|---|---|---|---|---|
| 11 | D11 | C11 | 2 | D11 | D12 | DUMMY | D13 | C11 | - |

E
| PAN ID | DESTINATION ID | OWN ID | RELAY-STATION COUNT | RELAY-1 ID | RELAY-2 ID | RELAY-3 ID | FINAL DESTINATION ID | ORIGINATOR ID | DATA |
|---|---|---|---|---|---|---|---|---|---|
| 11 | D12 | D11 | 1 | D12 | DUMMY | DUMMY | D13 | C11 | - |

F
| PAN ID | DESTINATION ID | OWN ID | RELAY-STATION COUNT | RELAY-1 ID | RELAY-2 ID | RELAY-3 ID | FINAL DESTINATION ID | ORIGINATOR ID | DATA |
|---|---|---|---|---|---|---|---|---|---|
| 11 | D13 | D12 | 0 | DUMMY | DUMMY | DUMMY | D13 | C11 | - |

COMMUNICATION APPARATUS

CROSS-REFERENCE TO RELATED APPLICATION

The present application is based upon and claims the benefit of priority of Japanese Patent Application No. 2014-039619, filed on Feb. 28, 2014, the entire contents of which are incorporated herein by reference.

BACKGROUND OF THE INVENTION

1. Field of the Invention

An aspect of this disclosure relates to a communication apparatus.

2. Description of the Related Art

There exists a multi-hop wireless network where a hop-count information acquisition unit of a radio station obtains hop-count information from connectable radio stations, and an upper destination radio station selection unit of the radio station selects a base station as an upper destination radio station when the radio station is directly connectable to the base station. When the radio station is not directly connectable to the base station, the upper destination radio station selection unit selects, based on the hop-count information, an upper destination radio station from the connectable radio stations such that the hop count becomes the smallest. A signal transfer unit of the radio station transfers a transmission signal or a signal received from a child radio station to the selected upper destination radio station, or to the base station, when the radio station is directly connectable to the base station (see, for example, Japanese Laid-Open Patent Publication No. 2001-237764).

When selecting an upper destination radio station from connectable radio stations based on hop-count information, there may be a case where there are multiple connectable radio stations with which the hop count becomes the smallest.

Also, there may be a case where the signal strength in communications between the radio station and the selected upper destination radio station or between the selected upper destination radio station and the base station is comparatively low, and it is difficult to achieve sufficient communication quality or to provide a stable communication path.

SUMMARY OF THE INVENTION

In an aspect of this disclosure, there is provided a communication apparatus for a radio communication network including plural apparatuses. The communication apparatus includes a detection unit that detects another apparatus in the radio communication network that is able to wirelessly communicate with the communication apparatus as a first apparatus; a first selection unit that determines a route for communication between the communication apparatus and another apparatus as a communication destination, the route may include an intervening apparatus, including the detected first apparatus, that relays communication between the communication apparatus and the communication destination, and selects, if plural routes are determined, a first route where a number of the intervening apparatuses is smallest from among the determined routes; and a second selection unit that, when two or more first routes are selected by the first selection unit, calculates, for each of the first routes, a sum of squares of each of first signal strength between two apparatuses in the determined first route as a second signal strength, and selects the route having the highest second signal strength from the determined first routes.

BRIEF DESCRIPTION OF THE DRAWINGS

FIG. 2 is a table illustrating a relay-station count, an RSSI of a section 1, an RSSI of a section 2, an RSSI of a section 3, a total RSSI, and an RSSI square sum for each of routes (1) through (4) in FIG. 1;

FIG. 6 is a flowchart illustrating an exemplary process performed by a communication apparatus;

FIG. 7A is a table illustrating parameter data;

FIG. 7B is a table illustrating data used for calculation of a sum of squares;

FIG. 8 is a table illustrating data stored in a parent apparatus;

FIG. 9 is a table illustrating parameter data of child apparatuses;

FIG. 10 is a table illustrating data stored in a parent apparatus;

FIG. 11 is a table illustrating parameter data of child apparatuses;

FIG. 12 is a table illustrating data stored in a parent apparatus;

FIG. 13 is a table illustrating parameter data of child apparatuses;

FIG. 14 is a table illustrating data stored in a parent apparatus;

FIG. 15 is a table illustrating parameter data of child apparatuses;

FIG. 16 is a table illustrating data stored in a parent apparatus;

FIG. 17 is a table illustrating parameter data of child apparatuses;

FIG. 20 is a drawing illustrating exemplary packet data.

DESCRIPTION OF EMBODIMENTS

Embodiments of the present invention are described below with reference to the accompanying drawings.

Figure 1:
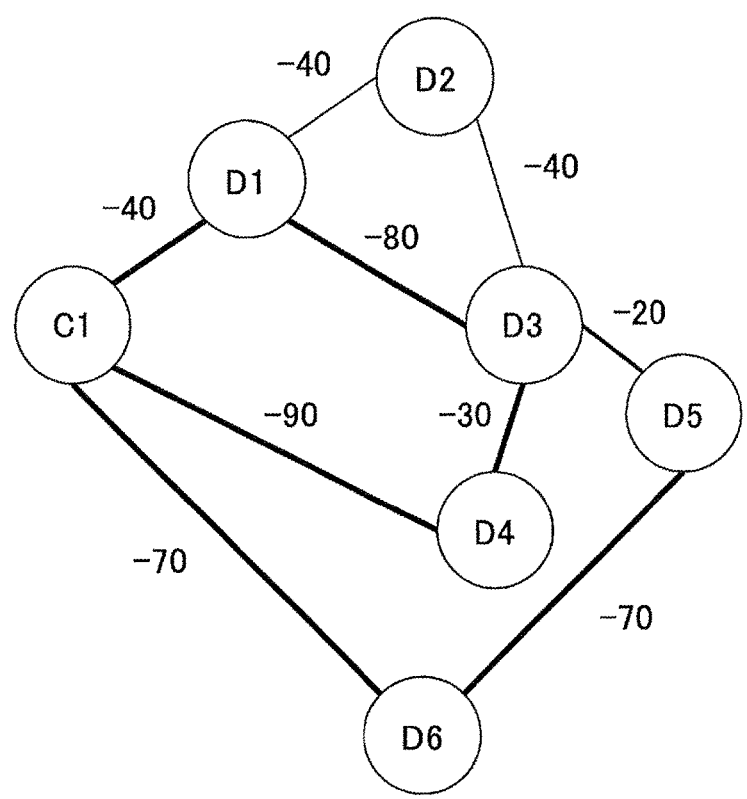
FIG. 1 is a drawing illustrating an exemplary arrangement of communication apparatuses.

FIG. 1 is a drawing illustrating an exemplary arrangement of communication apparatuses.

According to an embodiment, communication apparatuses include a parent apparatus and child apparatuses. A communication apparatus of the present embodiment is used as a child apparatus. A parent apparatus functions as a coordinator and is therefore indicated by an alphabet letter "C". A child apparatus functions as an end device and is indicated by an alphabet letter "D". FIG. 1 includes one parent apparatus C1 and six child apparatuses D1 through D6.

Here, it is assumed that the child apparatus D3 is newly added to a communication system, which is a radio communication network, where the parent apparatus C1 and the child apparatuses D1, D2, D4, D5, and D6 already exist.

How to set a communication route between the child apparatus D3 and the parent apparatus C1 is described.

In FIG. 1, each of sections between the parent apparatus C1 and child apparatuses and between two child apparatuses where communication can be established (hereinafter referred to as "communication section") is indicated by solid lines. Numerals assigned to the solid lines represent received signal strength indicators (RSSI) that indicate signal strengths (dBm) in the corresponding communication sections. The RSSI indicates the strength of a received signal. Accordingly, the signal strength in each communication section is indicated by the strength of a signal received at a reception side of the communication section.

In FIG. 1, the signal strength of the communication section between the parent apparatus C1 and the child apparatus D1 is −40 dBm, the signal strength of the communication section between the parent apparatus C1 and the child apparatus D4 is −90 dBm, and the signal strength of the communication section between the parent apparatus C1 and the child apparatus D6 is −70 dBm. No other communication section including the parent apparatus C1 exists in FIG. 1.

The signal strength of the communication section between the child apparatuses D1 and D2 is −40 dBm, the signal strength of the communication section between the child apparatuses D1 and D3 is −80 dBm, the signal strength of the communication section between the child apparatuses D2 and D3 is −40 dBm, the signal strength of the communication section between the child apparatuses D3 and D4 is −30 dBm, the signal strength of the communication section between the child apparatuses D3 and D5 is −20 dBm, and the signal strength of the communication section between the child apparatuses D5 and D6 is −70 dBm. No other communication section between any other two child apparatuses exists in FIG. 1.

When the signal strengths of the communication sections are as described above, the following four routes can be think of as candidate communication routes between the newly-added child apparatus D3 and the parent apparatus C1: (1) a route from the child apparatus D3 via the child apparatus D1 to the parent apparatus C1, (2) a route from the child apparatus D3 via the child apparatuses D2 and D1 to the parent apparatus C1, (3) a route from the child apparatus D3 via the child apparatus D4 to the parent apparatus C1, and (4) a route from the child apparatus D3 via the child apparatuses D5 and D6 to the parent apparatus C1.

The four routes (1) through (4) include different numbers of intervening child apparatuses (or "relay stations"), which exist in the communication route between the communication apparatus D3 and the parent apparatus C1, and communication sections with different RSSIs. The number of intervening child apparatus(es) in one route is referred to as "relay-station counts". Therefore, it is preferable to select one of the four routes (1) through (4) that is most stable.

FIG. 2 is a table illustrating a relay-station count, an RSSI of a section 1, an RSSI of a section 2, an RSSI of a section 3, a total RSSI, and an RSSI square sum for each of the routes (1) through (4) between the child apparatus D3 and the patent apparatus C1 in FIG. 1.

The RSSI of the section 1 indicates an RSSI of a communication section between the child apparatus D3 and a child apparatus that is next to the child apparatus D3 and serves as a first relay station. That is, in a route for transmitting data from the child apparatus D3 to the parent apparatus C1, the RSSI of the section 1 indicates an RSSI of the first communication section from the child apparatus D3.

The RSSI of the section 2 indicates an RSSI of a communication section between the first relay station and a child apparatus that is next to the first relay station and serves as a second relay station. That is, the RSSI of the section 2 indicates an RSSI of the second communication section from the child apparatus D3.

The RSSI of the section 3 indicates an RSSI of a communication section between the second relay station and a child apparatus that is next to the second relay station and serves as a third relay station. That is, the RSSI of the section 3 indicates an RSSI of the third communication section from the child apparatus D3.

The total RSSI indicates a sum of the RSSIs of the sections 1 through 3 in each of the routes (1) through (4). The RSSI square sum indicates a sum of squares of the RSSIs of the sections 1 through 3 in each of the routes (1) through (4). When the section 2 and/or the section 3 does not exist in the routes (1) through (4), an RSSI for that section is omitted.

As illustrated in FIG. 2, the relay-station count of the routes (1) and (3) is 1, and the relay-station count of the routes (2) and (4) is 2. Because the risk of occurrence of an error in data increases as the data passes through a relay station, the relay-station count is preferably small. Accordingly, in terms of the relay-station count, the routes (1) and (3) are more preferable than the routes (2) and (4).

On the other hand, the total RSSI of the routes (1) through (3) is −120 and the total RSSI of the route (4) is −160. Thus, in terms of the total RSSI, the routes (1) through (3) are more preferable than the route (4) as the total RSSIs are smaller than the route (4).

Judging from the relay-station count and the total RSSI, the routes (1) and (3) are more preferable than the routes (2) and (4). However, which one of the routes (1) and (3) is more preferable cannot be determined based only on the relay-station count and the total RSSI.

The RSSIs of the two communication sections included in the route (1) are −80 and −40, and the RSSIs of the two communication sections included in the route (3) are −30 and −90. Thus, the RSSIs of the communication sections in the route (1) are more even than the RSSIs of the communication sections in the route (3), and it seems that the route (1) is more preferable. Still, however, it is not possible to determine which one of the routes (1) and (3) is more preferable based only on the relay-station count and the total RSSI.

For the above reasons, in a communication apparatus according to the present embodiment, a route between the parent apparatus and the child apparatus is selected based on the RSSI square sum. In FIG. 2, the RSSI square sum of the route (1) is 8000 that is obtained by adding the square of the RSSI of the section (6400) and the square of the RSSI of the section 2 (1600). On the other hand, the RSSI square sum of the route (3) is 9000 that is obtained by adding the square of the RSSI of the section 1 (900) and the square of the RSSI of the section 2 (8100).

A communication apparatus of the present embodiment compares the RSSI square sum (8000) of the route (1) and the RSSI square sum (9000) of the route (3), and selects the route (1) whose RSSI square sum is less than that of the route (3). Thus, according to the present embodiment, a communication apparatus used as the child apparatus D3 in FIG. 1 sets the route (1) as a communication route to communicate with the parent apparatus C1.

In the example of FIG. 2, RSSIs of up to three forward sections (sections 1-3) ahead of the child apparatus D3 are shown in the table for each route, and the sum of squares of the RSSIs of up to two forward sections (sections 1-2) is calculated for each route as the RSSI square sum. Then, the route (1) with the smallest relay-station count and the smallest RSSI square sum is selected as the communication route between the child apparatus D3 and the parent apparatus C1.

However, in practice, there may be a case where a greater number of child apparatuses are present in the radio communication network and the number of relay stations between a child apparatus and a parent apparatus is greater than that in the example of FIG. 2.

In such a case, the child apparatuses may be gradually increased to expand the area covered by a radio communication network, as providing the child apparatuses D1, D4 and D6 around the parent device C1 first, then installing the child apparatuses D2 and D5, and thereafter adding the child apparatus D3 in the example of FIG. 1.

By providing a memory to each child apparatus and storing data indicating RSSIs of up to two forward sections ahead of the child apparatus (sections 1-2 as seen from each child apparatus) and a relay-station count in to the memory, it makes easier for the child apparatus D3 to be newly introduced into a radio communication network to obtain RSSIs of up to two forward sections (sections 2-3 as seen from the child apparatus D3) and a relay-station count for each of the routes (1) through (4) of FIG. 2 when the child apparatus D3 is newly installed.

This configuration makes it possible to easily set a communication route based on data indicating RSSIs of up to two forward sections (sections 1-2) and relay-station counts even when, for example, 100 child apparatuses exist between a child apparatus to be newly installed and a parent apparatus.

The number of forward sections of which RSSIs and a relay-station count are stored in the memory of each child apparatus may be determined freely.

For example, when 100 child apparatuses exist between a child apparatus to be newly installed and a parent apparatus, although the amount of calculation may increase, each child apparatus may store RSSIs and a relay-station count of all sections between the child apparatus and the parent apparatus.

Configurations and methods for setting a communication route are described below.

Figure 3A:
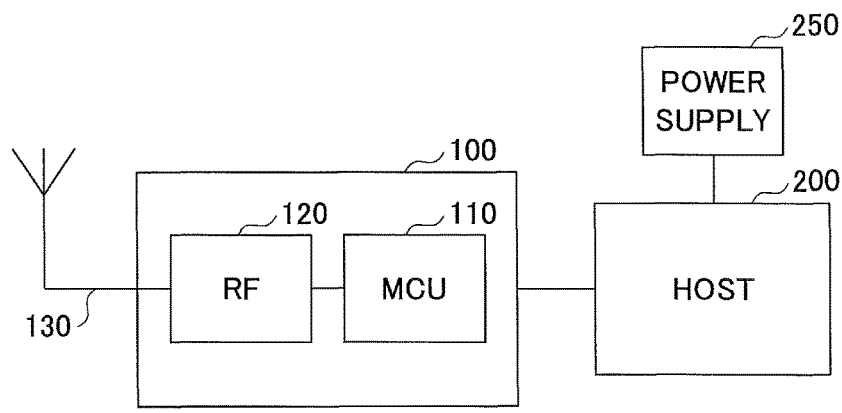
FIGS. 3A through 3C are drawings illustrating exemplary configurations of a communication apparatus.
Figure 3B:
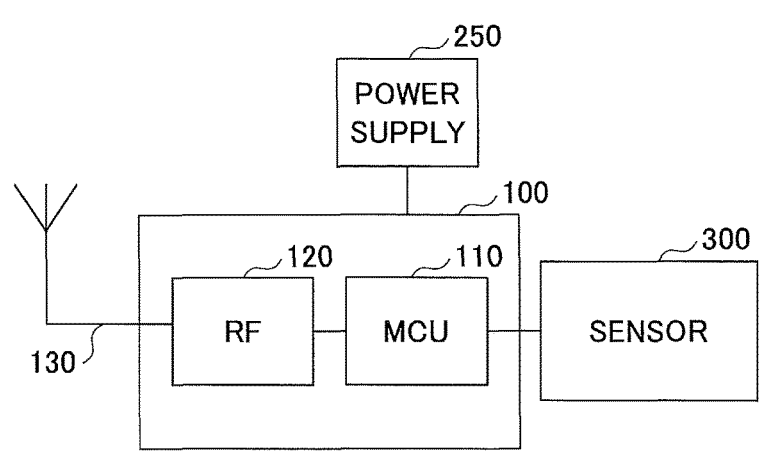
Figure 3C:
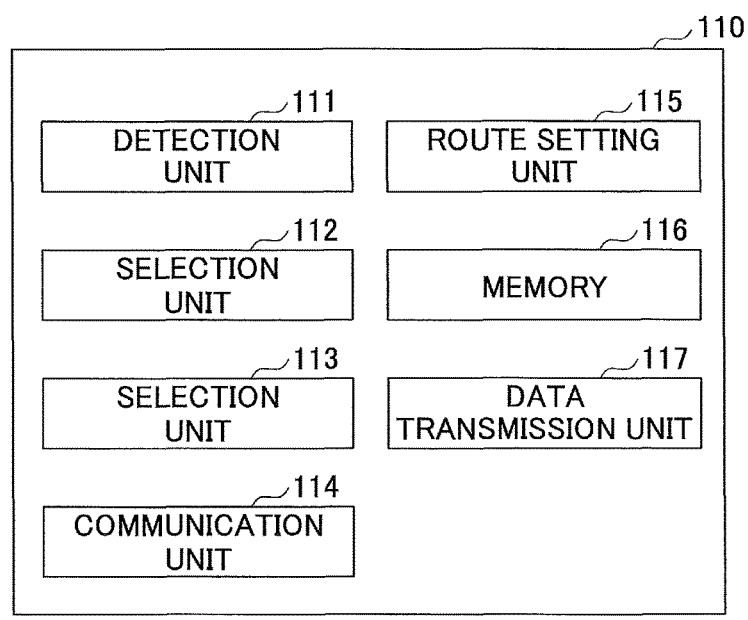

FIGS. 3A through 3C are drawings illustrating exemplary configurations of a communication apparatus 100 of the present embodiment. The communication apparatus 100 may have a configuration as illustrated by FIG. 3A or 3B.

The communication apparatus 100 illustrated by FIG. 3A includes a micro-computer unit (MCU) 11, a radio frequency (RF) circuit 120, and an antenna 130. The MCU 110 performs a communication route setting process as described above. Also, after setting a communication route, the MCU 110 performs a process necessary for communications with a parent apparatus. The RF circuit 120 mainly functions as an interface between the MCU 110 and the antenna 130. The antenna 130 may be implemented by any type of antenna such as a monopole antenna or a dipole antenna.

The communication apparatus 100 illustrated by FIG. 3A is connected to a host computer (HOST) 200. A power supply 250 is connected to the host computer 200. The host computer 200 sends commands or other information to the communication apparatus 100 to cause the MCU 110 to perform processes.

The communication apparatus 100 illustrated by FIG. 3B includes an MCU 11, an RF circuit 120, and an antenna 130. The MCU 110 performs a communication route setting process as described above. Also, after setting a communication route, the MCU 110 performs a process necessary for communications with a parent apparatus. The communication apparatus 100 illustrated by FIG. 3B is not connected to the host computer 200. Instead, a power supply 250 is directly connected to the communication apparatus 100. In the communication apparatus 100 illustrated by FIG. 3B, all processes are performed by the MCU 110.

A sensor 300 is connected to the communication apparatus 100 illustrated by FIG. 3B. The sensor 300 is, for example, a temperature sensor. When the communication apparatus 100 connected to the sensor 300 is used as each of the child apparatuses D1 through D6 of FIG. 1, it is possible to measure temperatures at multiple points in an area where the child apparatuses D1 through D6 are installed, and to collect temperature data by the parent apparatus C1.

The MCU 110 of FIGS. 3A and 3B includes functional units as illustrated by FIG. 3C. The MCU 110 includes a detection unit 111, a selection unit 112, a selection unit 113, a communication unit 114, a route setting unit 115, a memory 116, and a data transmission unit 117.

The detection unit 111 detects a response signal transmitted from one or more other communication apparatuses 100 in response to a first response request signal transmitted by the communication unit 114. The detection unit 111 detects one or more other communication apparatuses 100 that can wirelessly communicate with the communication apparatus 100 of its own (which is hereafter referred to as an "own communication apparatus"). Each other communication apparatus 100 detected by the detection unit 111 is an example of a first child apparatus. Multiple communication apparatuses (excluding the own communication apparatus 100 and the other communication apparatuses that are the first child apparatuses) in a radio communication network are examples of second child apparatuses.

The detection unit 111 detects a response signal transmitted from a parent apparatus in response to a second response request signal transmitted by the communication unit 114.

The selection unit 112 selects one or more routes whose relay-station count is smallest, from routes connecting the own communication apparatus 100 to a parent apparatus via the other communication apparatuses.

When multiple routes are selected by the selection unit 112, the selection unit 113 calculates the sum of squares of RSSIs of communication sections in each of the selected routes, and selects a route where the sum of squares of RSSIs is smallest. In other words, the selection unit 113 selects a route where a signal strength of communications sections is highest. In the present embodiment, a route where the sum of squares of RSSIs of communication sections is the smallest is selected as a route where a signal strength is highest.

Signal strength of each communication section is an example of first signal strength, and a signal strength indicated by the sum of squares of signal strength (first signal strength) of each of the communication sections is an example of a second signal strength.

Also, the selection unit 113 may be configured to select a route having the highest second signal strength and including communication sections all of which have first signal strengths that are greater than or equal to a predetermined lower limit, or a route having the highest second signal strength that is greater than or equal to a predetermined lower limit.

The communication unit 114 transmits a beacon signal as the first response request signal from the antenna 130 to enable the detection unit 111 to detect one or more other communication apparatuses 100 that can communicate with the own communication apparatus 100. The beacon signal is a digital packet signal.

The communication unit 114 also transmits a beacon signal as the second response request signal from the antenna 130 to enable the detection unit 111 to detect a parent apparatus that can communicate with the own communication apparatus 100. The beacon signal transmitted to a parent apparatus is also a digital packet signal, but is different from the beacon signal transmitted to find other communication apparatuses 100.

The route setting unit 115 sets a communication route from the own communication apparatus 100 to a parent apparatus based on the selection results of the selection unit 112 and the selection unit 113. When multiple routes having the smallest sum of squares are selected by the selection unit 113, the route setting unit 115 sets, as the communication route, one of the routes that includes another communication apparatus 100 whose response is detected first by the detection unit 111.

The memory 116 stores parameter data. The parameter data indicates RSSIs and a relay-station count of up to two forward sections (sections 1-2) in the communication route set for communications between the own communication apparatus 100 and a parent apparatus.

The data transmission unit 117 transmits the parameter data stored in the memory 116 when a response signal from another communication apparatus 100 or a response signal from a parent apparatus is detected.

When multiple routes are selected by the selection unit 112, the selection unit 113 selects one of the routes where a signal strength indicated by the sum of squares of signal strengths of communication sections is highest. In the present embodiment, the selection unit 113 calculates the sum of squares of RSSIs of communication sections in each of the selected routes, and selects one of the routes where the sum of squares of RSSIs is smallest. However, when signal strengths of communication sections are represented by, for example, milliwatts instead of RSSIs, the selection unit 113 selects a route where the sum of squares of signal strengths indicated by milliwatts is largest.

Figure 4:
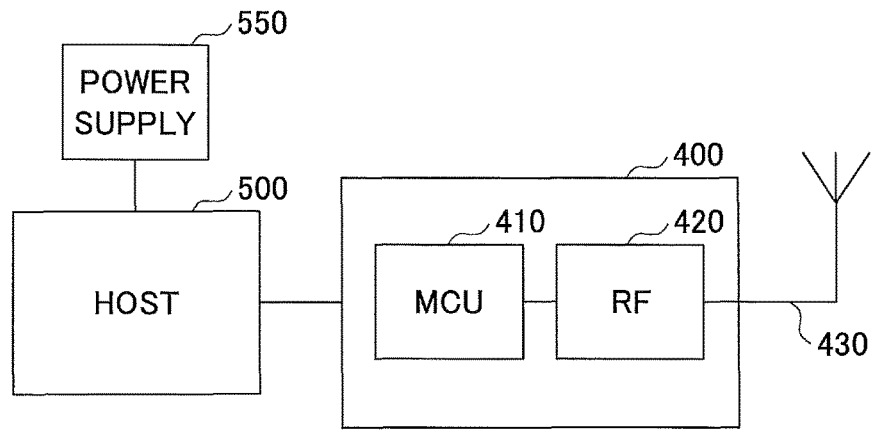
FIG. 4 is a drawing illustrating an exemplary configuration of a parent apparatus.

FIG. 4 is a drawing illustrating an exemplary configuration of a parent apparatus 400.

The parent apparatus 400 is a radio communication apparatus and includes a micro-computer unit (MCU) 410, a radio frequency (RF) circuit 420, and an antenna 430. The MCU 410 performs a process necessary for communications with a child apparatus, i.e., the communication apparatus 100, after a communication route is set through a communication route setting process as described above. The RF circuit 420 mainly functions as an interface between the MCU 410 and the antenna 430. The antenna 430 may be implemented by any type of antenna such as a monopole antenna or a dipole antenna.

The parent apparatus 400 is connected to a host computer (HOST) 500. A power supply 550 is connected to the host computer 500. The host computer 500, for example, sends commands to the parent apparatus 400 to cause the MCU 410 to perform processes.

Figure 5:
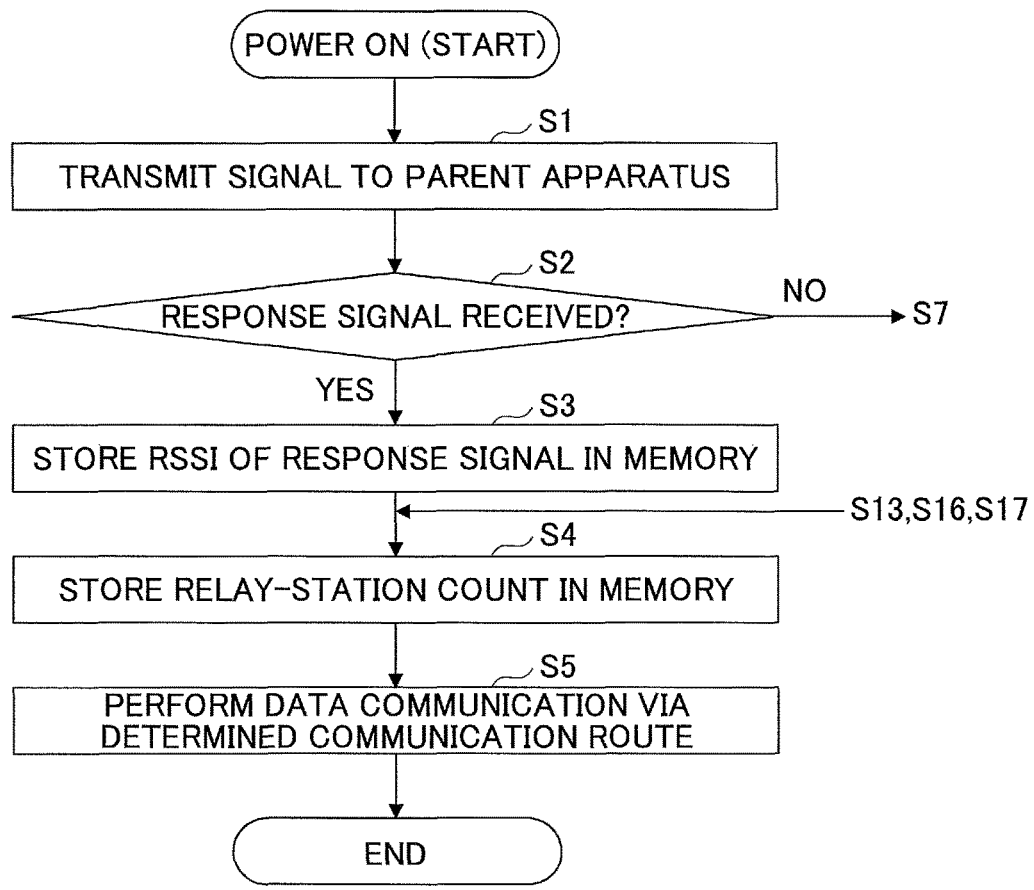
FIG. 5 is a flowchart illustrating an exemplary process performed by a communication apparatus.

FIGS. 5 and 6 are flowcharts illustrating an exemplary process performed by the MOU 110 of the communication apparatus 100 of the present embodiment. FIG. 7A is a table illustrating exemplary parameter data to be received at step S8 of FIG. 6. FIG. 7B is a table illustrating data used for calculation of a sum of squares at step S14 of FIG. 6.

When the communication apparatus 100 is turned on, the MCU 110 transmits a signal to the parent apparatus 400 (step S1) to determine whether the communication apparatus 100 can directly communicate with the parent apparatus 400. The signal transmitted to the parent apparatus 400 is for requesting a response from the parent apparatus 400. When the parent apparatus 400 is in a position where the parent apparatus 400 can communicate with the communication apparatus 100 directly, the parent apparatus 400 sends a response signal in response to the signal transmitted from the communication apparatus 100.

The MCU 110 determines whether a response signal is received from the parent apparatus 400 (step S2). The MCU 110 determines whether a response signal is received from the parent apparatus 400 within a predetermined time period. The predetermined time period may be obtained by adding a margin to a time period necessary to receive a response signal from the parent apparatus 400 after a response request signal is transmitted from the communication apparatus 100 when the communication apparatus 100 and the parent apparatus 400 are at the longest distance from each other that allows communications between them.

When a response signal is received from the parent apparatus 400 (YES at S2), the MCU 110 stores an RSSI of the response signal received from the parent apparatus 400 in the memory 116 (step S3). In this case, the communication apparatus 100 as a child apparatus can directly communicate with the parent apparatus 400, and a communication route between the communication apparatus 100 and the parent apparatus 400 is determined. Therefore, the MCU 110 of the communication apparatus 100 stores the RSSI in the memory 116.

Next, the MCU 110 stores a relay-station count in the memory 116 (step S4). When the communication apparatus 100 can directly communicate with the parent apparatus 400, the relay-station count for the communication route between the parent apparatus 400 and the communication apparatus 100 is zero (0).

Thereafter, the MCU 110 performs data communications with the parent apparatus 400 via the communication route determined at steps S3 and S4 (step S5). A reason to perform step S5 is described later.

After step S5, the process ends. Thus, when the communication apparatus 100 (child apparatus) and the parent apparatus 400 can directly communicate with each other, the process ends after step S5.

When no response signal is received from the parent apparatus 400 within the predetermined time period (NO at S2), the MCU 110 proceeds to step S7 of FIG. 6.

The MCU 110 transmits a beacon signal (step S7) to search for other communication apparatuses 100 located around the own communication apparatus 100.

The MCU 110 determines whether parameter data is received from other communication apparatuses 100 in response to the beacon signal (step S8). Specifically, the MCU 110 determines whether parameter data is received from other communication apparatuses 100 within a predetermined time period after transmitting the beacon signal at step S7.

The predetermined time period may be obtained by adding a margin to a time period necessary to receive a beacon signal from another communication apparatus 100 after a beacon signal is transmitted from the communication apparatus 100 when the own communication apparatus 100 and the other communication apparatus 100 are at the longest distance from each other that allows communications between them.

When the communication apparatus 100 has received the parameter data from any of the other communication apparatuses 100 (YES at S8), the MCU 110 stores RSSI of the signal received from the other communication apparatus 100 when receiving the parameter data in the memory 116 (step S9). The RSSI stored in the memory 116 is used to calculate the sum of squares of RSSIs.

Next, the MCU 110 stores the parameter data received at step S8 in the memory 116 (step S10). The parameter data received from another communication apparatus 100 indicates RSSIs of up to two forward sections ahead of the other communication apparatus 100 (sections 2-3 as seen from the communication apparatus 100) and a relay-station count in a communication route set for communications between the other communication apparatus 100 and the parent apparatus 400. Thus, when parameter data is received at step S8 from another communication apparatus 100, the MCU 110 stores received RSSIs of up to two forward sections ahead of the other communication apparatus 100 and a relay-station count in the memory 116.

Assuming a case of FIG. 2 where the child apparatus D3 is newly added to a radio communication network where the parent apparatus C1 and the child apparatuses D1, D2, D4, D5, and D6 already exist, RSSIs of the section 1 (a section between D3 and the other communication apparatus) to be stored at step S9 are measured when receiving parameter data from the child apparatuses D1, D2, D4, and D5. As illustrated in FIG. 7A, RSSIs measured when receiving the parameter data from the child apparatuses D1, D2, D4, and D5 are −80 dBm, −40 dBm, −30 dBm, and −20 dBm, respectively. These RSSIs correspond to the RSSIs of the section 1 in FIG. 2.

Also in this case, the parameter data received from the child apparatuses D1, D2, D4, and D5 is stored in the memory 116 at step S10. The received parameter data indicates RSSIs of up to two forward sections (sections 2-3 as seen from the communication apparatus 100) and a relay-station count in a communication route set for communications between the corresponding other communication apparatus 100 and a parent apparatus. In this exemplary case, the parameter data received at step S10 from each of the child apparatuses D1, D2, D4, and D5 indicates RSSIs of up to two forward sections and a relay-station count ahead of the corresponding one of the child apparatuses D1, D2, D4, and D5 (sections 2-3 as seen from the child apparatus D3).

That is, the parameter data received at step S10 from each of the child apparatuses D1, D2, D4, and D5 includes RSSIs (an RSSI of the first forward section and an RSSI of the second forward section ahead of each child apparatuses) that are obtained by the corresponding one of the child apparatuses D1, D2, D4, and D5 through communications with the parent apparatus C1. The parameter data received at step S10 from each of the child apparatuses D1, D2, D4, and D5 also includes a relay-station count indicating the number of relay stations (child apparatuses) between the corresponding one of the child apparatuses D1, D2, D4, and D5 and the parent apparatus C1.

As illustrated in FIG. 7A, regarding the child apparatus D1, the RSSI of the first forward section is −40 dBm and the RSSI of the second forward section is not available. Regarding the child apparatus D2, the RSSI of the first forward section is −40 dBm and the RSSI of the second forward section is −40 dBm. Regarding the child apparatus D4, the RSSI of the first forward section is −90 dBm and the RSSI of the second forward section is not available. Regarding the child apparatus D5, the RSSI of the first forward section is −70 dBm and the RSSI of the second forward section is −70 dBm.

The relay-station count of the child apparatus D1 is "0", the relay station count of the child apparatus D2 is "1", the relay station count of the child apparatus D4 is "0", and the relay station count of the child apparatus D5 is "1".

Next, the MCU 110 compares the relay-station counts in the parameter data stored in the memory 116 to determine a route(s) whose relay-station count is smallest (step S11). Taking the routes (1) through (4) in FIG. 2 as an example, the MCU 110 compares the relay-station counts of the routes (1) through (4), and determines the routes (1) and (3) having the smallest relay-station count.

Next, the MCU 110 determines whether only one route has the smallest relay-station count (step S12). When only one route has the smallest relay-station count, it is possible to determine a communication route without obtaining the sums of squares of RSSIs.

When only one route has the smallest relay-station count (YES at S12), the MCU 110 sets the route with the smallest relay-station count as a communication route (step S13).

When two or more routes have the smallest relay-station count (NO at S12), the MCU 110 calculates the sum of squares of RSSIs (RSSI square sum) for each of the routes determined at step S12 (step S14). Taking the routes (1) and (3) in FIG. 2 as an example, the MCU 110 calculates an RSSI square sum for each of the routes (1) and (3).

Assuming a case of FIG. 2 where the child apparatus D3 is newly added to the radio communication network where the parent apparatus C1 and the child apparatuses D1, D2, D4, D5, and D6 already exist, RSSIs of the first forward section of the child apparatuses D1 and D4 whose relay-station count is 0 and RSSIs measured by the child apparatus D3 when receiving the parameter data from the child apparatuses D1 and D4 are selected as data for calculating RSSI square sums.

The MCU 110 determines whether only one route has the smallest RSSI square sum (step S15).

When only one route has the smallest RSSI square sum (YES at S15), the MCU 110 sets the route with the smallest RSSI square sum as a communication route (step S16).

On the other hand, when two or more routes have the smallest RSSI square sum (NO at S15), the MCU 110 sets, as a communication route, one of the routes that has the smallest RSSI square sum and includes the other communication apparatus 100 whose parameter data is received earliest at step S8 (step S17). This is because a route including a communication apparatus returning a response earliest is assumed to be the most stable route.

After performing steps S13, S16, or S17, the MCU 110 returns to step S4.

At step S4, the MCU 110 stores a relay-station count in memory 116.

At step S5, the MCU 110 transmits parameter data of the own communication apparatus 100 via the determined communication route to the parent apparatus 400. This step is performed to report parameter data regarding the communication route set by the communication apparatus 100 to the parent apparatus 400. The MCU 110 performs data communications with the parent apparatus 400 via the communication route to transmit the parameter data.

How parameter data (a relay-station count and RSSIs) is determined is described below with reference to FIGS. 8 through 17 using the child apparatuses D1 through D6 of FIG. 1 as the communication apparatuses 100. In the descriptions below, it is assumed that the parent apparatus C1 in FIG. 1 is installed first, and the child apparatuses D1, D2, D4, D6, D5, and D3 are installed in this order.

FIGS. 8, 10, 12, 14, and 16 illustrate data retained by the parent apparatus C1. FIGS. 9, 11, 13, 15, and 17 illustrate parameter data of the child apparatuses D1 through D6.

First, the child apparatus D1 is installed in an environment where the parent apparatus C1 has already been installed. The signal strength of a communication section between the parent apparatus C1 and the child apparatus D1 is −40 dBm, and no relay station exists between the parent apparatus C1 and the child apparatus D1. In this case, as illustrated in FIG. 8, N/A (not available) is specified in each of "relay station 1" through "relay station 4" (fields) for the child apparatus D1. Also, as illustrated in FIG. 9, zero (0) is specified in "relay station count" (field), −40 is specified in "RSSI of section 1" (field), and N/A is specified in "RSSI of section 2" (field) for the child apparatus D1.

Next, the child apparatus D2 is installed. The signal strength of a communication section between the child apparatuses D1 and D2 is −40 dBm, the signal strength of a communication section between the parent apparatus C1 and the child apparatus is −40 dBm, and only the child apparatus D1 exists as a relay station between the child apparatus D2 and the parent apparatus C1. In this case, as illustrated in FIG. 10, D1 is specified in "relay station 1", and N/A is specified in each of "relay station 2" through "relay station 4". Also, as illustrated in FIG. 11, 1 is specified in "relay station count", −40 is specified in "RSSI of section 1", and −40 is specified in "RSSI of section 2" for the child apparatus D2.

The case where the child apparatus D2 is installed corresponds to a case where steps S1, S2, S3, S4, and S5 of FIG. 5 are performed.

Next, the child apparatuses D4 and D6 are installed. The signal strength of a communication section between the parent apparatus C1 and the child apparatus D4 is −90 dBm, and the signal strength of a communication section between the parent apparatus C1 and the child apparatus D6 is −70 dBm. No relay station exists between the child apparatus D4 and the parent apparatus C1 and between the child apparatus D6 and the parent apparatus C1.

In this case, as illustrated in FIG. 12, N/A is specified in each of "relay station 1" through "relay station 4" for the child apparatuses D4 and D6. Also, as illustrated in FIG. 13, zero (0) is specified in "relay station count", −90 is specified in "RSSI of section 1", and N/A is specified in "RSSI of section 2" for the child apparatus D4. Also, zero (0) is specified in "relay station count", −70 is specified in "RSSI of section 1", and N/A is specified in "RSSI of section 2" for the child apparatus D6.

The case where the child apparatuses D4 and D6 are installed corresponds to a case where steps S1, S2, S3, S4, and S5 of FIG. 5 are performed.

Next, the child apparatus D5 is installed. From the child apparatus D5 to the parent apparatus C1, there exist routes that go through the child apparatus D3 and one or more of the child apparatuses D1, D2, and D4, and a route that goes through the child apparatus D6. Among these routes, the route going through the child apparatus D6 has the smallest relay-station count. Therefore, for the child apparatus D5, the route that connects to the parent apparatus C1 via the child apparatus D6 is set as a communication route.

The signal strength of a communication section between the child apparatuses D5 and D6 is −70 dBm, and the signal strength of a communication section between the parent apparatus C1 and the child apparatus D6 is −70 dBm. Only the child apparatus D6 exists as a relay station between the child apparatus D5 and the parent apparatus C1. In this case, as illustrated in FIG. 14, D6 is specified in "relay station 1", and N/A is specified in each of "relay station 2" through "relay station 4". Also, as illustrated in FIG. 15, 1 is specified in "relay station count", −70 is specified in "RSSI of section 1", and −70 is specified in "RSSI of section 2" for the child apparatus D5.

The case where the child apparatus D5 is installed corresponds to a case where steps S1, S2, S7, S8, S9, S10, S11, S12, S13, S4, and S5 in FIG. 5 are performed.

Then, the child apparatus D3 is newly installed. As described above, there exist the routes (1) through (4) between the child apparatus D3 and the parent apparatus C1. A process as illustrated by FIGS. 5 and 6 is performed, results as illustrated by FIG. 2 are obtained, and the route (1) is set as a communication route.

The signal strength of a communication section between the child apparatuses D1 and D3 is −80 dBm, and the signal strength of a communication section between the parent apparatus C1 and the child apparatus D1 is −40 dBm. Only the child apparatus D1 exists as a relay station between the child apparatus D3 and the parent apparatus C1. In this case, as illustrated in FIG. 16, D1 is specified in "relay station 1", and N/A is specified in each of "relay station 2" through "relay station 4" for the child apparatus D3. Also, as illustrated in FIG. 17, 1 is specified in "relay station count", −80 is specified in "RSSI of section 1", and −40 is specified in "RSSI of section 2" for the child apparatus D3.

A communication route of each communication apparatus 100 is set as described above. After the communication route is set, the communication apparatus 100 communicates with the parent apparatus 400 via the set communication route. This applies to all of the child apparatuses D1 through D6 illustrated in FIG. 1.

Figure 18:
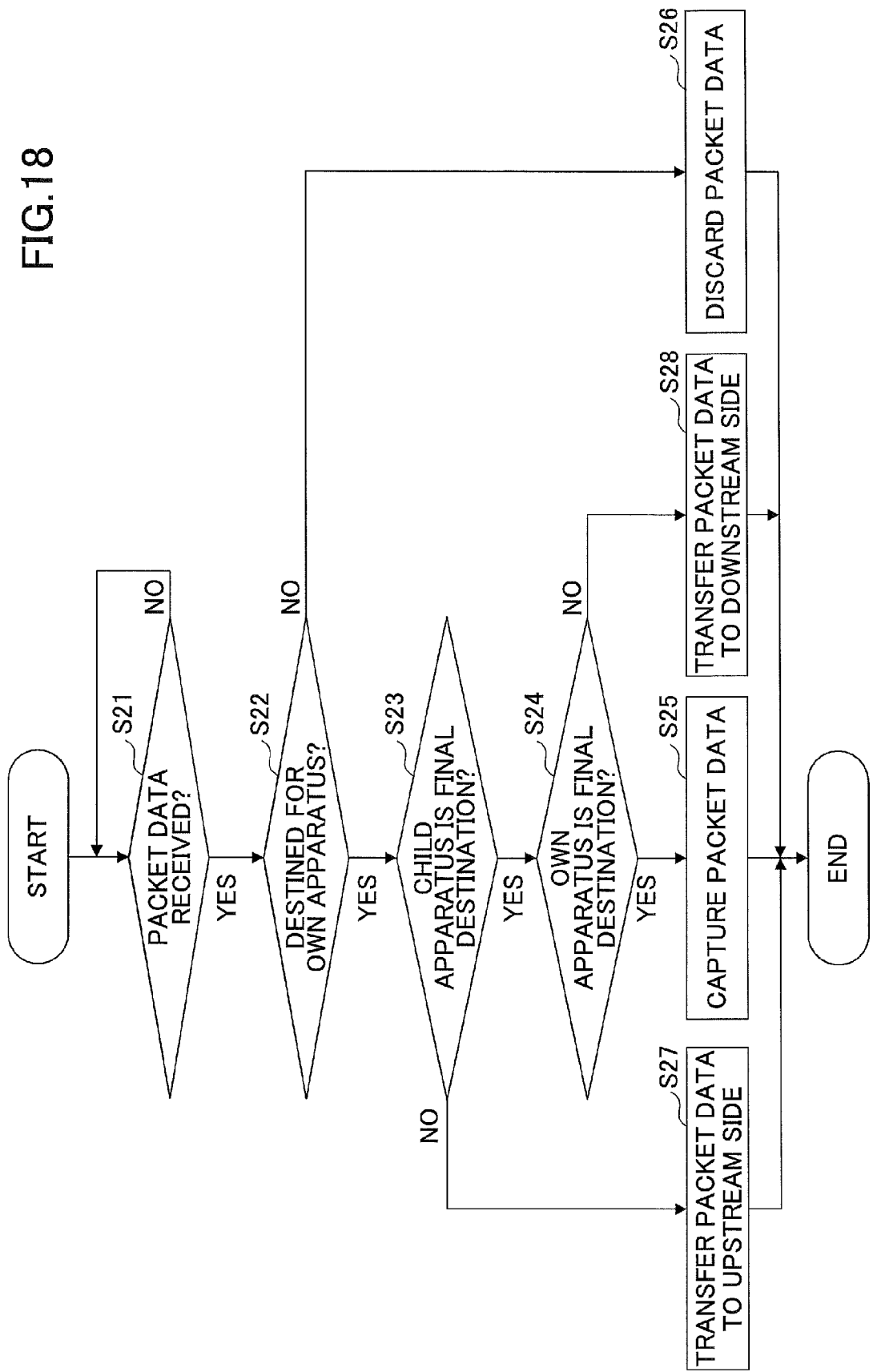
FIG. 18 is a flowchart illustrating an exemplary process performed by a child apparatus.

FIG. 18 is a flowchart illustrating a process performed by a child apparatus (the communication apparatus 100) when packet data is transmitted from the parent apparatus 400 via a communication route to any of the child apparatuses. For example, this process is performed by each of the child apparatuses D1 and D3 when packet data is transmitted from the parent apparatus C1 via the child apparatus D1 to the child apparatus D3. That is the process of FIG. 18 is performed by all child apparatuses (communication apparatuses 100) that communicate with the parent apparatus 400, directly or indirectly through the other child apparatuses.

In the descriptions below, in a case where packet data is transferred between the parent apparatus 400 and a child apparatus (communication apparatus 100), a direction going from the child apparatus toward the parent apparatus 400 is referred to as an "upstream" side and a direction going away from the parent apparatus 400 relative to the child apparatus is referred to as a "downstream" side.

The MCU 110 determines whether packet data has been received (step S21). The MCU 110 repeats step S21 until packet data is received.

When packet data has been received (YES at S21), the MCU 110 determines whether the destination of the packet data is the own communication apparatus 100 (step S22). This can be determined based on whether an address of the own communication apparatus 100 is included in destination addresses in the packet data.

When the destination of the packet data is the own communication apparatus 100 (YES at S22), the MCU 110 determines whether a child apparatus is the final destination of the packet data (step S23). This step is performed to determine whether the packet data is to be transferred to the parent apparatus 400 or from the parent apparatus 400 to a child apparatus.

On the other hand, when the destination of the packet data is not the own communication apparatus 100 (NO at S22), the MCU 110 discards the packet data (step S26). This is because packet data not destined for the own communication apparatus 100 is not intended to be transferred via a communication route including the own communication apparatus 100.

When the final destination of the packet data is a child apparatus (YES at S23), the MCU 110 determines whether the final destination is the own communication apparatus 100 (step S24). This step is performed to determine whether to capture the packet data.

When the final destination of the packet data is the own communication apparatus 100 (YES at S24), the MCU 110 captures the packet data (step S25), and ends the process.

When the final destination of the packet data is not the own communication apparatus 100 (NO at S24), the MCU 110 modifies (or converts) the packet data and transfers the modified packet data to the downstream side (step S28). This is because the final destination is a child apparatus located downstream of the own communication apparatus 100 when the final destination is a child apparatus but not the own communication apparatus 100. The modification of the packet data is described later.

When, the final destination of the packet data is not a child apparatus (NO at S23), the MCU 110 modifies (or converts) the packet data and transfers the modified packet data to the upstream side (step S27). This is because the final destination is the parent apparatus 400 if the final destination is not a child apparatus. The modification of the packet data is described later.

After performing step S26, S27, or S28, the MCU 110 ends the process.

Next, modification (or conversion) of packet data is described with reference to FIGS. 19 and 20 using an exemplary case where a parent apparatus C11 and child apparatuses D11, D12, and D13 communicate with each other.

Figure 19:
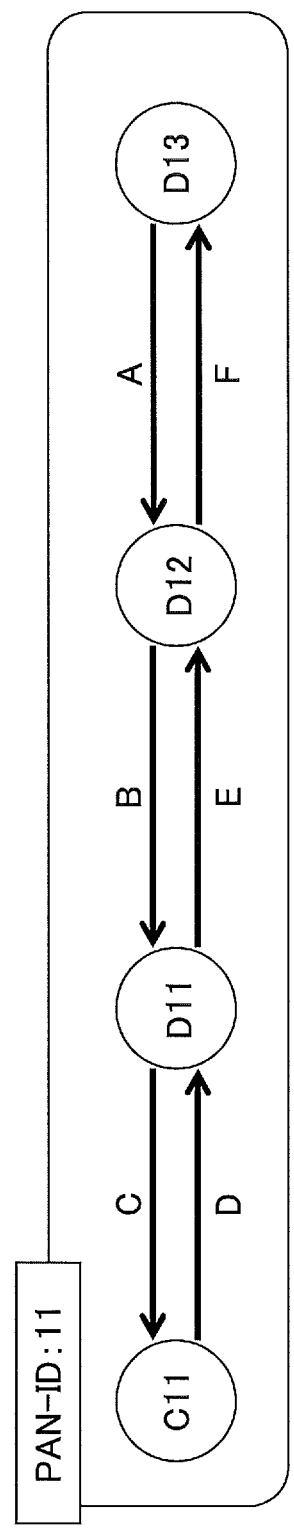
FIG. 19 is a drawing illustrating an exemplary arrangement of a parent apparatus and child apparatuses.

FIG. 19 is a drawing illustrating an exemplary arrangement of the parent apparatus C11 and the child apparatuses D11, D12, and D13.

As illustrated by FIG. 19, the parent apparatus C11 and the child apparatuses D11, D12, and D13 are arranged in this order and form a radio communication network. A personal area network ID (PAN-ID) "11" is assigned to the parent apparatus C11. The parent apparatus C11 has a configuration that is substantially the same as the configuration of the parent apparatus 400 of FIG. 4, and each of the child apparatuses D11, D12, and D13 has a configuration that is substantially the same as the configuration of the communication apparatus 100 of FIGS. 3A through 3C.

Communication sections between the parent apparatus C11 and the child apparatuses D11, D12, and D13 are defined as described below. A communication section A represents a communication from the child apparatus D13 to the child apparatus D12. A communication section B represents a communication from the child apparatus D12 to the child apparatus D11. A communication section C represents a communication from the child apparatus D11 to the parent apparatus C11.

A communication section D represents a communication from the parent apparatus C11 to the child apparatus D11. A communication section E represents a communication from the child apparatus D11 to the child apparatus D12. A communication section F represents a communication from the child apparatus D12 to the child apparatus D13.

Thus, between the parent apparatus C11 and the child apparatus C, an upstream communication route including the communication sections A through C and a downstream communication route including the communication sections D through F are established.

FIG. 20 is a drawing illustrating exemplary packet data. Tables A through F in FIG. 20 represent packet data at the corresponding communication sections A through F of FIG. 19. The packet data includes a PAN-ID, a destination ID, an own ID, a relay-station count, a relay-1 ID, a relay-2 ID, a relay-3 ID, a final destination ID, an originator ID, and data. The packet data may include any type of "data", and therefore a description of "data" is omitted here.

Because modification (or conversion) of packet data in a radio communication network including the parent apparatus C11 is described here, all of the tables A through F include the same PAN-ID "11". Therefore, the destination ID, the own ID, the relay-station count, the relay-1 ID, the relay-2 ID, the relay-3 ID, the final destination ID, and the originator ID are described below.

The destination ID is an ID of one of the parent apparatus C11 and the child apparatuses D11 through D13 that is a destination of the data. The own ID is an ID of one of the parent apparatus C11 and the child apparatuses D11 through D13 that is a sender of the data.

When the data is transmitted in an upstream direction (i.e., from the child apparatuses toward the parent apparatus C11), the relay-station count indicates the number of relay stations between the originator of the data which initially sends the data and the destination represented by the destination ID. In the case of communication from the child apparatus D13 to the parent apparatus C11 as illustrated in FIG. 19, the originator is the child apparatus D13.

When the data is transmitted in the upstream direction, the relay-1 ID indicates an ID of the first relay station between the originator of the data and the destination represented by the destination ID. In the case of communication from the child apparatus D13 to the parent apparatus C11 as illustrated in FIG. 19, the relay-1 ID is "D12".

When the data is transmitted in the upstream direction, the relay-2 ID indicates an ID of the second relay station (child apparatus) between the originator of the data and the destination represented by the destination ID.

When the data is transmitted in the upstream direction, the relay-3 ID indicates an ID of the third relay station between the originator of the data and the destination represented by the destination ID.

When the data is transmitted in a downstream direction (i.e., from the parent apparatus C11 toward the child apparatuses), the relay-station count indicates the number of relay stations between the sender (indicated by the own ID) of the data and the final destination.

When the data is transmitted in the downstream direction, the relay-1 ID indicates an ID of the first relay station between the sender of the data and the final destination.

When the data is transmitted in the downstream direction, the relay-2 ID indicates an ID of the second relay station between the sender of the data and the final destination.

When the data is transmitted in the downstream direction, the relay-3 ID indicates an ID of the third relay station between the sender of the data and the final destination.

The final destination ID is an ID of one of the parent apparatus C11 and the child apparatuses D11 through D13 that is the final destination of the data. The originator ID is an ID of one of the parent apparatus C11 and the child apparatuses D11 through D13 that initially sends the data.

At the communication section A from the child apparatus D13 from the child apparatus D12, the destination ID is D12, the own ID is D13, the relay-station count is 0 as no relay station exists, the relay-1 ID is N/A (not available), the relay-2 ID is N/A, the relay-3 ID is N/A, the final destination ID is C11, and the originator ID is D13. The packet data to be transmitted from the child apparatus D13 toward the parent apparatus C11 includes data items as described above at the communication section A.

At the communication section B, the destination ID is D11, the own ID is D12, the relay-station count is 1, the relay-1 ID is D12, the relay-2 ID is N/A, the relay-3 ID is N/A, the final destination ID is C11, and the originator ID is D13. Thus, the packet data transmitted from the child apparatus D13 toward the parent apparatus C11 is modified as described above at the communication section B.

At the communication section C, the destination ID is C11, the own ID is D11, the relay-station count is 2, the relay-1 ID is D12, the relay-2 ID is D11, the relay-3 ID is N/A, the final destination ID is C11, and the originator ID is D13. Thus, the packet data transmitted from the child apparatus D13 toward the parent apparatus C11 is modified as described above at the communication section C.

As described above, when data is transferred in the upstream direction via a communication route between the child apparatus D13 and the parent apparatus C11, the packet data is modified (or converted) by each relay station. For example, the packet data is modified at step S27 of FIG. 18.

At the communication section D, the destination ID is D11, the own ID is C11, the relay-station count is 2, the relay-1 ID is D11, the relay-2 ID is D12, the relay-3 ID is N/A, the final destination ID is D13, and the originator ID is C11. The packet data transmitted from the parent apparatus C11 toward the child apparatus D13 includes data items as described above at the communication section D.

At the communication section E, the destination ID is D12, the own ID is D11, the relay-station count is 1, the relay-1 ID is D12, the relay-2 ID is N/A, the relay-3 ID is N/A, the final destination ID is D13, and the originator ID is C11. Thus, the packet data transmitted from the parent apparatus C11 toward the child apparatus D13 is modified as described above at the communication section E.

In the communication section F, the destination ID is D13, the own ID is D12, the relay-station count is 0, the relay-1 ID is N/A, the relay-2 ID is N/A, the relay-3 ID is N/A, the final destination ID is D13, and the originator ID is C11. Thus, the packet data transmitted from the parent apparatus C11 toward the child apparatus D13 is modified as described above at the communication section F.

As described above, when data is transferred in the downstream direction via a communication route between the child apparatus D13 and the parent apparatus C11, the packet data is modified (or converted) by each relay station. For example, the packet data is modified at step S28 of FIG. 18.

As described above, data can be transferred between the parent apparatus C11 and the child apparatus D13 by modifying packet data.

An aspect of this disclosure provides a communication apparatus that can select a stable communication route.

A communication apparatus according to an embodiment of the present invention is described above. However, the present invention is not limited to the specifically disclosed embodiment, and variations and modifications may be made without departing from the scope of the present invention.

What is claimed is:

1. A communication apparatus for a radio communication network including plural apparatuses, the communication apparatus comprising:
   a detection unit that detects a first apparatus in the radio communication network that is able to wirelessly communicate with the communication apparatus;
   a first selection unit that
      determines a route for communication between the communication apparatus and a destination apparatus, the route including one or more intervening apparatuses that include the detected first apparatus and that relay communication between the communication apparatus and the destination apparatus, and
      selects, if plural routes are determined, a first route where a number of the intervening apparatuses is smallest from among the determined routes; and
   a second selection unit that, when two or more first routes are selected by the first selection unit,
      calculates, for each of the first routes, a sum of squares of received signal strength indicators (RSSIs) between respective pairs of apparatuses in each of the first routes as a total signal strength, and
      selects one of the first routes having the highest second total signal strength.

2. The communication apparatus as claimed in claim 1, further comprising:
   a communication unit that transmits a first response request signal requesting to return a response,
   wherein the detection unit detects one of the plural apparatuses returning the response as the first apparatus.

3. The communication apparatus as claimed in claim 2, wherein
   the communication unit transmits a second response request signal requesting the destination apparatus to return a response when the communication apparatus is installed in the radio communication network; and
   the detection unit transmits the first response request signal when no response to the second response request signal is returned from the destination apparatus.

4. The communication apparatus as claimed in claim 1, further comprising:
   a route setting unit that sets the one of the first routes selected by the second selection unit as a communication route for communications between the communication apparatus and the destination apparatus.

5. The communication apparatus as claimed in claim 4, further comprising:
   a communication unit that transmits a first response request signal requesting to return a response, wherein
   the detection unit detects two or more of the plural apparatuses returning the response as first apparatuses; and
   when two or more of the first routes are selected by the second selection unit, the route setting unit sets one of the selected first routes that includes one of the first apparatuses that has returned the response earliest.

6. The communication apparatus as claimed in claim 1, wherein the second selection unit selects the one of the first routes
   that has the highest total signal strength and in which all of the RSSIs are greater than or equal to a predetermined lower limit, or
   that has the highest total signal strength that is greater than or equal to a predetermined lower limit.

7. The communication apparatus as claimed in claim 4, further comprising:

a memory that stores data including
- a total number of the intervening apparatuses in the communication route, and
- one of the RSSIs between the respective pairs of the apparatuses in the communication route and the total signal strength of the communication route.

8. The communication apparatus as claimed in claim 7, further comprising:
a data transmission unit that transmits the data stored in the memory when a first response request signal requesting to return a response is received from another communication apparatus in the radio communication network.

* * * * *